United States Patent
Sugama et al.

(10) Patent No.: US 10,502,507 B2
(45) Date of Patent: Dec. 10, 2019

(54) PLATE-TYPE HEAT EXCHANGER AND METHOD FOR PRODUCING SAME

(71) Applicant: NIPPON STEEL NISSHIN CO., LTD., Chiyoda-ku, Tokyo (JP)

(72) Inventors: Atsushi Sugama, Sakai (JP); Manabu Oku, Sakai (JP); Yoshiaki Hori, Shunan (JP); Kazunari Imakawa, Shunan (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 372 days.

(21) Appl. No.: 15/119,905

(22) PCT Filed: Feb. 18, 2015

(86) PCT No.: PCT/JP2015/054465
§ 371 (c)(1),
(2) Date: Aug. 18, 2016

(87) PCT Pub. No.: WO2015/125831
PCT Pub. Date: Aug. 27, 2015

(65) Prior Publication Data
US 2017/0067700 A1    Mar. 9, 2017

(30) Foreign Application Priority Data
Feb. 18, 2014 (JP) .................................. 2014-028899

(51) Int. Cl.
*F28F 19/00* (2006.01)
*B23K 1/00* (2006.01)
(Continued)

(52) U.S. Cl.
CPC ............ *F28F 19/00* (2013.01); *B23K 1/0012* (2013.01); *B23K 20/02* (2013.01); *F28D 9/005* (2013.01);
(Continued)

(58) Field of Classification Search
CPC . F28F 19/00; F28F 19/06; F28F 3/025; B23K 1/0012; B23K 20/02; F28D 9/005
See application file for complete search history.

(56) References Cited

U.S. PATENT DOCUMENTS 3,537,165 A * 11/1970 Kemp .................. F28D 9/0043
165/148
4,327,802 A   5/1982 Beldam
(Continued)

FOREIGN PATENT DOCUMENTS

| CA | 2643757 A1 | 10/2007 |
| CN | 101317069 A | 12/2008 |

(Continued)

OTHER PUBLICATIONS

Notification of Reasons for Refusal for Japanese Patent Application No. 2014-028899; dated Apr. 11, 2017.
(Continued)

*Primary Examiner* — Tho V Duong
(74) *Attorney, Agent, or Firm* — Cantor Colburn LLP

(57) ABSTRACT

A plate-type heat exchanger may include a housing. The housing may include a plurality of rectangular plate-like components that are box-like components each having the same shape and having a standing wall section along a peripheral edge. One of the box-like components may be layered on another components reversed in the horizontal direction to form a layered structure having an upper layer component and a lower layer component such that an upper portion of a standing wall section of the lower layer component of the layered structure is fit into a lower portion of a standing wall section of the upper layer component of the layered structure. The angle (θ) of the standing wall sections may be θ≤30°, and at least a portion of a contact region (Continued)

between the upper portion and the lower portion may be joined by solid phase diffusion bonding.

4 Claims, 3 Drawing Sheets

(51) Int. Cl.
  *B23K 20/02*  (2006.01)
  *F28F 19/06*  (2006.01)
  *F28D 9/00*  (2006.01)
  *F28F 3/02*  (2006.01)
  *B23K 101/14*  (2006.01)

(52) U.S. Cl.
  CPC .............. *F28F 3/025* (2013.01); *F28F 19/06* (2013.01); *B23K 2101/14* (2018.08); *F28F 2275/04* (2013.01); *F28F 2275/061* (2013.01)

(56) References Cited

U.S. PATENT DOCUMENTS

| | | | |
|---|---|---|---|
| 5,931,219 A | 8/1999 | Kull et al. | |
| 6,161,615 A * | 12/2000 | Brieden | F28D 9/005 165/166 |
| 6,182,746 B1 | 2/2001 | Wiese | |
| 6,340,054 B1 * | 1/2002 | Schwarz | F01M 5/002 165/153 |
| 6,843,311 B2 * | 1/2005 | Evans | F28D 9/005 165/109.1 |
| 7,404,434 B2 * | 7/2008 | Martin | F28F 9/026 165/167 |
| 8,167,029 B2 * | 5/2012 | Bertilsson | F28D 9/005 165/167 |
| 8,662,152 B2 * | 3/2014 | Arvidsson | F28D 9/005 165/167 |
| 8,857,504 B2 * | 10/2014 | Christensen | F28D 9/005 165/167 |
| 2007/0245560 A1 | 10/2007 | Matsuzaki et al. | |
| 2008/0257536 A1 * | 10/2008 | Kolblin | F28D 9/005 165/167 |
| 2009/0064579 A1 * | 3/2009 | Wakasugi | B01J 19/0093 48/76 |

FOREIGN PATENT DOCUMENTS

| | | |
|---|---|---|
| EP | 1676089 A1 | 7/2006 |
| EP | 2568248 A2 | 3/2013 |
| EP | 3062949 A1 | 9/2016 |
| JP | S6080083 A | 5/1985 |
| JP | H03006437 B2 | 1/1991 |
| JP | H0886585 A | 4/1996 |
| JP | 08271175 A | 10/1996 |
| JP | 2000111292 A | 4/2000 |
| JP | 2000193390 A | 7/2000 |
| JP | 2006183945 A | 7/2006 |
| JP | 2006183969 A | 7/2006 |
| JP | 2007268555 A | 10/2007 |
| JP | 2010085094 A | 4/2010 |
| JP | 2010094903 A | 4/2010 |
| JP | 2013103271 A | 5/2013 |
| JP | 2013173181 A | 9/2013 |
| JP | 2013204149 A | 10/2013 |
| JP | 2013204150 A | 10/2013 |
| WO | 2005038382 A1 | 4/2005 |
| WO | 2007038871 A1 | 4/2007 |
| WO | 20007036963 A1 | 4/2007 |
| WO | 2015062992 A1 | 5/2015 |

OTHER PUBLICATIONS

Extended European Search Report corresponding to Application No. 15752539.5: dated Jan. 3, 2017.
International Search Report corresponding to Application No. PCT/JP2015/054465; dated May 19, 2015, with English translation.
Indian Office Action corresponding to Applicaiton No. 201617030257; dated Sep. 27, 2019.

* cited by examiner

BOX-LIKE UPPER COMPONENT

HEAT EXCHANGER

BOX-LIKE LOWER COMPONENT (CORRESPONDS TO THE BOX-LIKE UPPER COMPONENT ROTATED BY 180°)

[ASSEMBLING DRAWING (ELEVATION)]

LOW TEMPERATURE
TOP PLATE
A
(SCREW JOINT)
BOX-LIKE COMPONENT
B
HIGH TEMPERATURE
C
BOTTOM PLATE

[ASSEMBLING DRAWING (PERSPECTIVE)]

INSIDE (LOW TEMPERATURE)
A
C
B
INSIDE (HIGH TEMPERATURE)

<CROSS SECTION a-a'>

| JOINING REGIONS | LOCATIONS |
|---|---|
| c | FIN SHAPED-REGION | ○ |
| d | STANDING WALL SECTION | ▭ |

STRUCTURES OF JOINING REGIONS

<CROSS SECTION b-b'>

| CONDITIONS | PRELIMINARY CHAMBER | HEATING CHAMBER | COOLING CHAMBER |
|---|---|---|---|
| TEMPERATURE | ~400°C | (1) 1000°C<br>(2) 1100°C<br>(3) 1200°C | 900°C~<br>1000°C~ |
| AMBIENT PRESSURE | $1 \times 10^{-2}$ Pa | $1 \times 10^{-4}$ ~ $1 \times 10^{-2}$ Pa | Ar (90kPa) |

PLATE-TYPE HEAT EXCHANGER AND METHOD FOR PRODUCING SAME

CROSS REFERENCE TO RELATED APPLICATIONS

This is the U.S. national stage of application No. PCT/JP2015/054465 filed Feb. 18, 2015. Priority under 35 U.S.C. § 119(a) and 35 U.S.C. § 365(b) is claimed from Japanese Application No. 2014-028899, filed Feb. 18, 2014, the disclosure of which is also incorporated herein by reference.

TECHNICAL FIELD

The present invention relates to a plate-type heat exchanger in which a plurality of heat-transfer plates were layered.

BACKGROUND ART

Among various types of heat exchangers, plate-type heat exchangers are used for electric water heaters, industrial equipment, car air-conditioners or the like because their heat exchanging performance is very high.

A plate-type heat exchanger has layered plates for providing paths of heat exchange media, i.e., paths for high- and low-temperature media configured to be adjacent each other so that heat exchange is effected mutually by virtue of the temperature difference between the media flowing through these paths of the high- and low-temperature media.

For example, in Patent Document 1, plates having corrugated portions for forming flow paths are layered and joined by various joining methods (fastening with a gasket and screw, welding, brazing) to obtain a structure in which high-temperature flow paths and low-temperature flow paths are alternated. Meanwhile, in view of an improved durability of a heat exchanger itself, stainless steel sheets, which have excellent corrosion resistance, are used as metal plate materials.

Further, for small-to-medium sized heat exchangers, joining operations are often performed by brazing in view of pressure resistance.

Patent Document 1: Japanese Unexamined Patent Application, Publication No. 2010-85094

DISCLOSURE OF THE INVENTION

Problems to be Solved by the Invention

However, attempts for layering and joining corrugated plate-like components by brazing may result in joining defects inherent to braze materials, such as erosion and cracks occurring upon joining, decreased corrosion resistance and buried flow paths with a braze melt. Further, the cost of braze materials is also an issue.

Meanwhile, as a method in which decreased corrosion resistance is prevented at a joining region, solid phase diffusion bonding may be used instead of brazing. Solid phase diffusion bonding is a joining method which takes advantage of interdiffusion of atoms of a base material occurring at a joining interface under high temperature and high pressure, and can produce a joining region having such strength and corrosion resistance comparable to those of the base material. However, the quality of joining by solid phase diffusion may be affected by the applied pressure, temperature and the like at a joining surface.

In particular, in a case where a stainless steel sheet is used as a metal plate material, diffusion bonding of a stainless steel may be strongly affected by an additive element. When large amounts of easily oxidizable elements, Al, Ti, and Si are contained therein, a robust oxide or oxide film may be formed on a surface layer of a joining interface to inhibit joining.

Further, when layered plate-like components are pressurized both from the upward and downward directions to perform solid phase diffusion bonding, adjacent plates tend be joined insufficiently at side-edge surfaces although solid phase diffusion bonding can be sufficiently achieved at joining surfaces in the vertical direction.

This occurs because pressing force tends to be insufficient in the lateral direction. The present invention is made to solve the above problems. An objective of the present invention is to provide a method of conveniently manufacturing a robustly air-tightened plate-type heat exchanger even when a stainless steel sheet in particular is used as a base material, the method comprising: defining shapes of side-edge surfaces of plate-like components of a plate-type heat exchanger; and performing joining of the side-edge surfaces and flow paths in the plate-like components adjacent in the vertical direction by solid phase diffusion bonding instead of brazing. Note that use of a braze material is acceptable in a region where a load may not be added easily.

Means for Solving the Problems

To this end, the plate-type heat exchanger according to the present invention is characterized by that a housing of the heat exchanger comprises a plurality of rectangular plate-like components, and the rectangular plate-like components are box-like components each having the same shape and having a standing wall section along a peripheral edge, and one of the box-like components is layered on another of the box-like components reversed in the horizontal direction to form a layered structure having an upper layer component and a lower layer component such that an upper portion of a standing wall section of the lower layer component of the layered structure is fit into a lower portion of a standing wall section of the upper layer component of the layered structure, and the angle ($\theta$) of the standing wall sections is $\theta \leq 30°$, and at least a portion of a contact region between the upper portion of the standing wall section and the lower portion of the standing wall section is joined by solid phase diffusion bonding.

Further, braze bonding may also be performed for at least a portion of the above contact region depending on a desired joining strength. Other contact regions between the upper layer component and the lower layer component are also preferably joined by solid phase diffusion bonding or braze bonding.

Preferably, the box-like components are press-formed articles each having two types of opening sections at predetermined positions on an upper side thereof, one being opened and protruded upwardly from each of the box-like components and the other being opened and protruded to the same height inwardly from each of the box-like components, and an upper side of the upwardly protruded opening section of the lower layer component is joined with a lower side on the downwardly protruded opening section of the upper layer component at a contact region therebetween by solid phase diffusion bonding or braze bonding.

Preferably, a fin having a cross-sectional shape of a triangle or trapezoid or rectangle and having the same height as a flange is further formed at an upper side-flat portion of the layered box-like components, and when a tip piece of the upper layer component is brought into contact with a flat portion in the vicinity of a punching shoulder of the lower layer component, tips of the fins make contact with each other, and a joining region of a flow path formed at the contact region after solid phase diffusion bonding or braze bonding of the both has a good joining strength comparable to that of a base material.

The followings may also be allowed: a fin component having a cross-sectional shape of a triangle or trapezoid or rectangle and having the same height as a flange is arranged between layered two box-like components, when a tip piece of the upper layer component is brought into contact with a flat portion in the vicinity of a punching shoulder of the lower layer component, tips of the fins make contact with an upper side-flat portion of a box-like component, and the both are joined at the contact region by solid phase diffusion bonding or braze bonding to form a flow path.

When the plate-type heat exchanger having a configuration as described above is manufactured using a stainless steel sheet as a base material, a layered assembly of the box-like components prepared with a single-phase ferritic stainless steel sheet or an austenitic stainless steel sheet or a martensitic stainless steel sheet having a chemical composition of 0.1 Si+Ti+Al<0.15 mass % and a surface roughness of Ra≤0.3 μm may be heated under an atmosphere of a heating temperature of 1100° C. or more and an applied pressure of 0.3 MPa or more and 1×10-2 Pa or less to perform solid phase diffusion bonding. Here, 1×10-2 Pa or less means an ambient pressure when the heating temperature is reached. Once the ambient pressure in a furnace during heating is reduced to this pressure, an inert gas such as Ar and N2 may be contained in the furnace thereafter.

When a two-phase stainless steel sheet having a chemical composition of 0.1 Si+Ti+Al<0.15 mass % is used, and heating is performed under an atmosphere of a heating temperature of 1000° C. or more, an applied pressure of 0.1 MPa or more and an ambient pressure of 1×10-2 Pa or less, even a stainless steel sheet having a surface roughness of Ra≤2.0 μm can be sufficiently joined by solid phase diffusion bonding.

Effects of the Invention

According to the present invention, at least a portion of joining of side-edge surfaces of plate-like components constituting a plate-type heat exchanger and joining of flow paths in upper and lower plate-like components is performed by solid phase diffusion bonding in which a braze material such as Cu and Ni is not used.

Therefore, a robustly air-tightened plate-type heat exchanger can be obtained at low cost. Further, a plate-type heat exchanger having excellent durability can be obtained at low cost because a stainless steel sheet is used as a steel sheet material.

PREFERRED MODE FOR CARRYING OUT THE INVENTION

As described above, the present plate-type heat exchanger has layered plates arranged to provide paths of heat exchange media, i.e., paths for high- and low-temperature media configured to be adjacent each other so that heat exchange is effected mutually by virtue of the temperature difference between the media flowing through these paths for the high- and low-temperature media.

Figure 1:
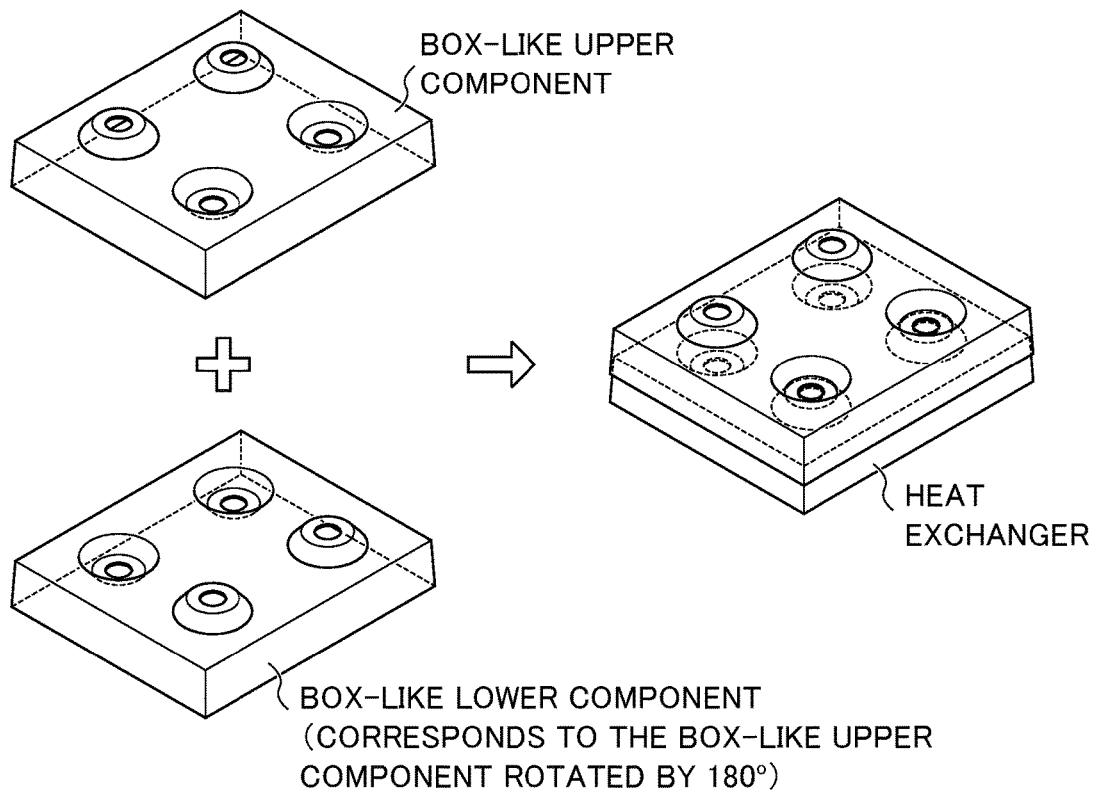
FIG. 1 illustrates the structure of a conventional layered plate-type heat exchanger.
Figure 2A:
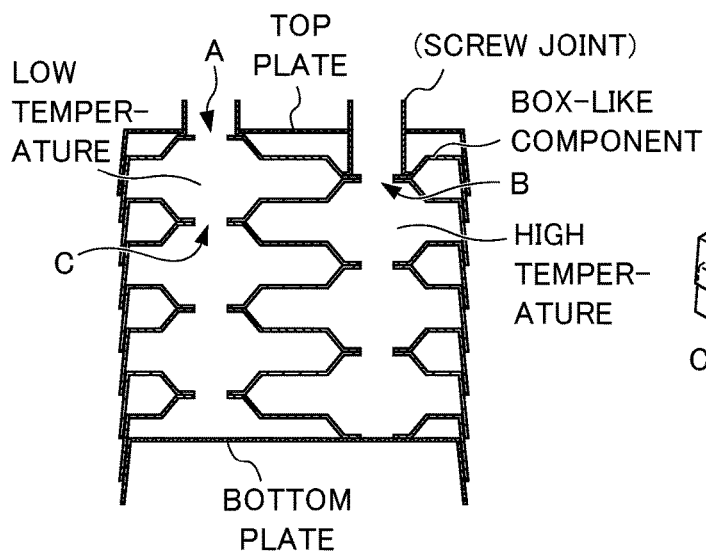
FIG. 2A and FIG. 2B illustrate the structure of flow paths of the conventional layered plate-type heat exchanger.
Figure 2B:
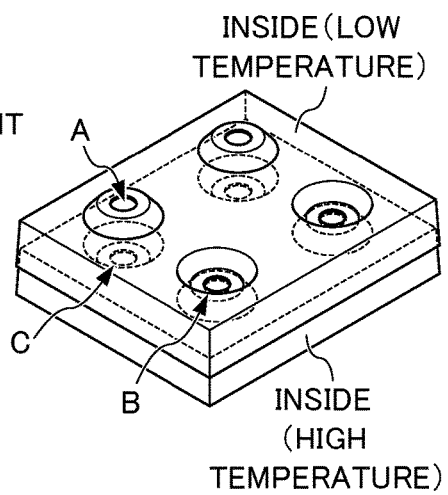

A heat exchanger with a simple structure may be manufactured as follows: for example, a plurality of box-like components each having a similar shape are manufactured, and one of the box-like components horizontally rotated by about 180° to reverse the orientation is layered on another of the box-like components, and then lamination of box-like components is further repeated as shown in FIG. 1 and FIGS. 2A and 2B.

In addition, the upper and lower components need to be air-tightened at a contact region between a peripheral edge-standing wall section and a peripheral edge of an opening section of the layered box-like components in order to operate the above layered product as a heat exchanger.

The heat exchanger as shown in FIG. 2A and FIG. 2B can be obtained as follows: a steel sheet is pressed to form a box-like component such that a peripheral edge-standing wall section is slightly tilted in the outward direction, and two types of opening sections are formed at predetermined positions, one being opened upwardly at a height less than one-half of that of the peripheral edge-standing wall section on the above rectangular plate-like component and the other being opened inwardly at a height similarly less than one-half of that of the peripheral edge-standing wall section on the above rectangular plate-like component, and the resulting box-like component is mounded on a bottom plate, over which another box-like component having the same shape is then mounded after said another box-like component is horizontally rotated by about 180° to reverse the orientation, and then these procedures are repeated as required. Note that the peripheral edge-standing wall section of the upper box-like component is configured to be fit to and overlapped with the peripheral edge-standing wall section of the lower box-like component.

Here, the upper component needs to be air-tightly joined with the lower component. Regions to be air-tightly joined include a contact region between an downward opening-end portion to be served as a flow path of an upper component and an upward opening-end portion to be served as a flow path of an lower component; and an overlapping portion between a peripheral edge-standing wall section of an upper box-like component and a peripheral edge-standing wall section of a lower box-like component.

When solid phase diffusion bonding is attempted for each of the above regions instead of brazing in the layered structure as described above, a load can be appropriately applied to the contact region between a lower opening-end portion of an upper component and an upper opening-end portion of a lower component. However, a satisfactory load is difficult to be applied to the overlapping portion between standing wall sections at the peripheral edges. That is, it is very difficult to apply a load to the overlapping portion between peripheral edge-standing wall sections both from the upward and downward directions, and thus solid phase diffusion bonding cannot be sufficiently performed.

Therefore, an improved method needs to be developed for joining the overlapping portion between peripheral edge-standing wall sections.

Accordingly, in the present invention, the contact region between the lower opening-end portion of the upper component and an upper opening-end portion of the lower component is performed by solid phase diffusion bonding, and the overlapping portion between the peripheral edge-standing wall section of the upper box-like component and the peripheral edge-standing wall section of the lower box-like component is defined into a specific shape, thereby achieving a sufficient joining quality.

Figure 3A:
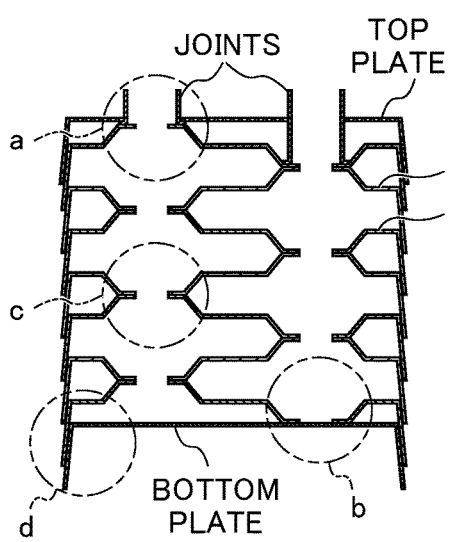
FIG. 3A and FIG. 3B illustrate the structure of flow paths of the layered plate-type heat exchanger according to the present invention.
Figure 3B:
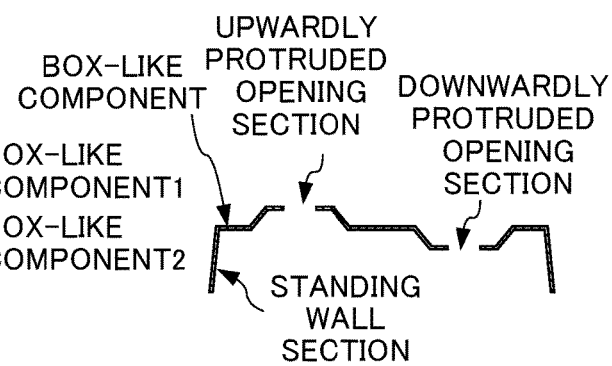

Specifically, as shown in FIG. 3B, a steel sheet is press-formed to produce a box-like component such that a standing wall section is provided at a peripheral edge, and two types of opening sections are formed at predetermined positions on the upper surface thereof, one being opened and protruded upwardly on the box-like component and the other being opened and protruded inwardly at the same height on the box-like component. Note that in FIG. 3A, a box-like component 1 and a box-like component 2 have the same shape, but are in a horizontally reversed orientation relative to each other. Therefore, the height of a single box-like rectangular plate-like component is equal to the total sum of the heights of the opening sections opened and protruded upwardly and downwardly.

The above box-like component is mounded on a bottom plate, over which another box-like component having the same shape is then mounded after said another box-like component is horizontally rotated by about 180° to reverse the orientation, and these procedures are repeated as required.

Then, a joint and a top plate which are separately prepared are attached to the layered product to obtain the structure of a heat exchanger as seen in FIG. 3A. Note that the peripheral edge-standing wall section of an upper box-like component is configured to be fit to and overlapped with the peripheral edge-standing wall section of a lower box-like component. For this reason, the height of a standing wall section need to be higher than the total sum of the heights of the opening sections opened and protruded upwardly and downwardly.

Figure 5A:
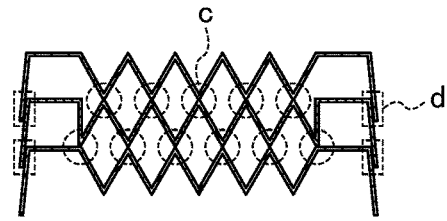
FIG. 5A and FIG. 5B illustrate the structure of a cross-section of the layered plate-type heat exchanger shown in FIG. 4.
Figure 5B:
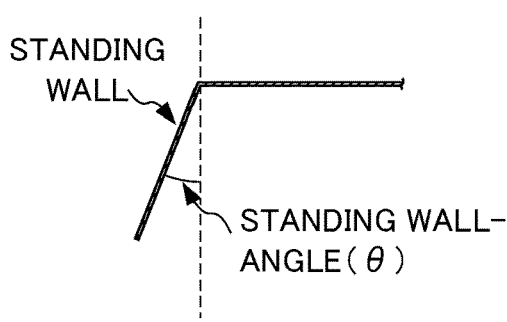

In the present invention, at least a portion of the peripheral edge-standing wall section of an upper box-like component and the peripheral edge-standing wall section a lower box-like component is joined by solid phase diffusion bonding. In order to achieve this, the outwardly tilted angles of the peripheral edge-standing wall section of an upper box-like component and a lower box-like component, each a standing-wall angle ($\theta$) as shown in FIG. 5B, are preferably $15° \leq \theta \leq 30°$ in order to allow a load to be applied to the standing wall sections both from the upward and downward directions when performing solid phase diffusion bonding. When a portion of the standing wall portion is brazed to achieve robust air-tightness, $\theta$ is preferably minimized as small as possible such as $0° \leq \theta \leq 15°$ so as to allow the standing wall portion to slightly tilt outwardly without increasing the size of a plate-type heat exchanger itself.

When a layered product where the box-like component 1 and the box-like component 2 arranged in a reversed orientation relative to the box-like component 1 are assembled as shown in FIG. 3A along with a bottom plate, a top plate and a joint separately prepared is maintained at high temperature while applying a load both from the upward and downward directions, locations indicated as a, b, c and d in FIG. 3A are joined by the action of solid phase diffusion bonding.

By the way, in a heat exchanger, paths for heat exchange media, i.e., paths for high- and low-temperature media are configured to be adjacent each other so that heat exchange is effected mutually by virtue of the temperature difference between the media flowing through these paths for high- and low-temperature media. Therefore, an increased surface of a partition wall separating the paths for high- and low-temperature media is effective for increasing the efficiency of heat exchange.

Accordingly, in the present invention, a fin having a cross-sectional shape of a triangle or trapezoid or rectangle and having the same height as that of a box-like component is provided on an upper side-flat portion of a layered box-like component.

Figure 4:
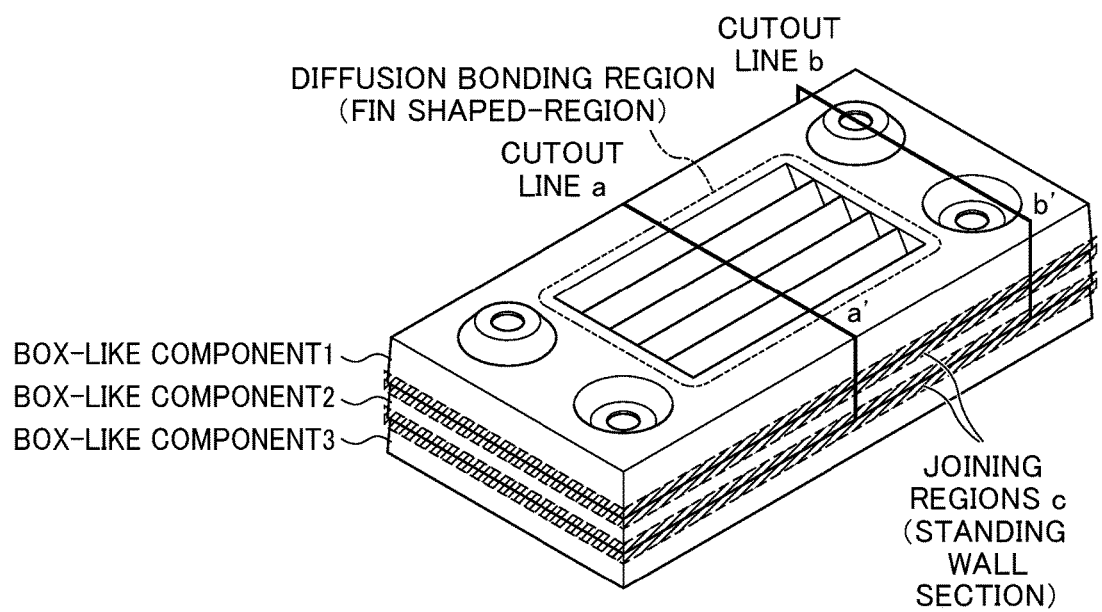
FIG. 4 illustrates an aspect of the present invention where a fin is provided at a flat portion of a box-like component.

Specifically, as shown in FIG. 4, a fin having a cross-sectional shape of a triangle, trapezoid or rectangle and having the same height as that of a box-like component is formed on an upper side-flat portion of the box-like component in the direction toward the inside of the box-like component. This box-like component having the fin formed on the upper side-flat portion is layered. Note that in FIG. 4, the box-like component 2 is arranged to be in a reverse orientation relative to the box-like component 1, and a box-like component 3 having the same shape as the box-like component 1 is arranged in the same direction as the box-like component 1.

When the standing wall section of an upper box-like component is layered so as to be fit into the standing wall section of a lower box-like component, the tips of the fins is brought into contact with each other. Therefore, when the assembly in this state is maintained at high temperature while applying a load both from the upward and downward directions, portions indicated by circles and squares in FIG. 5A are joined by the action of solid phase diffusion bonding. Note that the fin components may be joined each other by braze bonding.

Instead of forming a fin on a box-like component itself, a fin and a box-like component may be produced separately, and a fin component may be arranged between the upper and lower box-like components layered.

In a case where a portion of a standing wall portion is brazed, the followings may be mainly used as braze materials: a Ni braze BNi-5 defined in JISZ3265, a BNi-5 based braze containing P, a Cu braze BCu-1 (oxygen-free copper) defined in JISZ3262. A paste-like material prepared by mixing a powder with a binder and a braze material formed into a foil-like form can be used. The types, forms and usage amounts of braze materials may be selected depending on the base material, shape and the like of a box-like component. For example, preferably, a braze material in an amount of 0.1 g/cm2 or more and 1.0 g/cm2 or less is applied to a gap formed at standing wall portions when a box-like component having a fin component arranged therein is layered.

In the above, the structure of the plate-type heat exchanger according to the present invention is described. As also described in a section where problems to be solved are discussed, a stainless steel sheet is preferably used as a base steel material in order to confer durability on the plate-type heat exchanger according to the present invention under an environment where corrosion resistance is required.

However, in a case where a stainless steel sheet is used as a steel plate material, diffusion bonding of the stainless steel may be strongly affected by an additive element. When large amounts of easily oxidizable elements, Al, Ti, Si are contained therein, a robust oxide or oxide film may be formed on a surface of a joining interface, resulting in inhibition of joining.

Therefore, when manufacturing the plate-type heat exchanger according to the present invention using a stainless steel sheet as a base material, the present inventors control the contents of easily-oxidizable elements, Al, Ti and Si, and define the surface profile of the base stainless steel sheet and the applied pressure and heating temperature when performing solid phase diffusion bonding.

There is no limitation for the general composition of a stainless steel to be used. The followings may be used: single-phase ferritic stainless steel sheets, austenitic stainless steel sheets, martensitic stainless steel sheets or two-phase stainless steel sheets having common compositions as defined in JIS and the like.

When large amounts of easily-oxidizable elements, Al, Ti and Si are contained, a robust oxide or oxide film may be formed at a surface of a joining interface, resulting in inhibition of joining. Therefore, the total amount thereof will be controlled. Details will be described in Examples. Briefly, when 0.1 Si+Ti+Al is 0.15% or more, oxidation may be promoted inside articles to be joined, resulting in insufficient joining performance.

A preferred stainless steel sheet for use in the present invention is a single-phase ferritic stainless steel sheet consisting of C: 0.0001 to 0.15%, Si: less than 1.5%, Mn: 0.001 to 1.2%, P: 0.001 to 0.045%, S: 0.0005 to 0.03%, Ni: 0 to 0.6%, Cr: 11.5 to 32.0%, Cu: 0 to 1.0%, Mo: 0 to 2.5%, Al: less than 0.15%, Ti: less than 0.15%, Nb: 0 to 1.0%, V: 0 to 0.5%, N: 0 to 0.025% by mass and the remainder Fe and inevitable impurities.

Further, it may also be an austenitic stainless steel sheet consisting of C: 0.0001 to 0.15%, Si: less than 1.5%, Mn: 0.001 to 2.5%, P: 0.001 to 0.045%, S: 0.0005 to 0.03%, Ni: 6.0 to 28.0%, Cr: 15.0 to 26.0%, Cu: 0 to 3.5%, Mo: 0 to 7.0%, Al: less than 0.15%, Ti: less than 0.15%, Nb: 0 to 1.0%, V: 0 to 0.5%, N: 0 to 0.3% by mass and the remainder Fe and inevitable impurities.

Moreover, it may also be a martensitic stainless steel sheet consisting of C: 0.15 to 1.5%, Si: less than 1.5%, Mn: 0.001 to 1.0%, P: 0.001 to 0.045%, S: 0.0005 to 0.03%, Ni: 0.05 to 2.5%, Cr: 13.0 to 18.5%, Cu: 0 to 0.2%, Mo: 0 to 0.5%, Al: less than 0.15%, Ti: less than 0.15%, Nb: 0 to 0.2%, V: 0 to 0.2% by mass and the remainder Fe and inevitable impurities.

Furthermore, it may also be a ferritic-martensitic two-phase stainless steel sheet or a ferritic-austenitic two-phase stainless steel sheet consisting of C: 0.0001 to 0.15%, Si: less than 1.5%, Mn: 0.001 to 1.0%, P: 0.001 to 0.045%, S: 0.0005 to 0.03%, Ni: 0.05 to 6.0%, Cr: 13.0 to 25.0%, Cu: 0 to 0.2%, Mo: 0 to 4.0%, Al: less than 0.15%, Ti: less than 0.15%, Nb: 0 to 0.2%, V: 0 to 0.2%, N: 0.005 to 0.2% by mass and the remainder Fe and inevitable impurities.

In order to maintain manufacturability, 0 to 0.01% of B and 0 to 0.1% of one or more of Ca, Mg and REM may be added to the aforementioned stainless steels.

Moreover, in solid phase diffusion bonding, joining is performed while metals to be joined are strongly pressed against each other.

Therefore, the surface roughness of the both will strongly affect the joining quality thereof. Details about the surface roughness will also be described in Examples below. In a case where solid phase diffusion bonding is performed under an applied pressure of 0.3 MPa, the surface roughness of a two-phase stainless steel sheet, which can be relatively easily diffusion bonded, needs to be Ra≤2.0 μm, depending on the pressure at a contact surface between the metals to be joined. The surface roughness of a single-phase ferritic stainless steel sheet or an austenitic stainless steel sheet or a martensitic stainless steel sheet, which may be difficult to be diffusion bonded, needs to be Ra≤0.3 μm.

The applied pressure applied between stainless steel sheets to be diffusion bonded will be set to 0.1 MPa or more for a two-phase stainless steel, 0.3 MPa or more for single-phase ferritic or austenitic or martensitic stainless steel sheets. A value of the applied pressure equal to or less than these values is not preferred for commercial products as described below because heating to higher temperature is required to form a sound joining interface. A value of the applied pressure equal to or more than these values can enable diffusion bonding to be performed with relatively simple equipment.

A metal weight is preferably used to apply the applied pressure both from the upward and downward directions. A thermally resistant ferritic stainless steel having excellent thermal resistance and small thermal expansion is preferably used for a weight. The applied pressure may be calculated by dividing a load of a weight by upper and lower joining areas.

A passivation film and an oxide film on the surface of joining is easier to break as the applied pressure upon heating increases, which may be responsible for impaired joining, and the contact area between microscopically uneven surfaces of steel sheets (the interface contact area) can be easily increased. Therefore, the atomic diffusion area expands, resulting in facilitated diffusion bonding. On the other hand, when a larger weight is used to increase the applied pressure, load shifting due to an unstable center of mass and poor shaping due to an uneven load tend to occur. Further, when the load of a weight is increased, a ratio of the weight to the allowable load of a hearth or transfer rails is increased. Therefore, the weight of products which can be loaded will be limited, resulting in significantly decreased mass-productivity. Therefore, the applied pressure is preferably 0.8 MPa or less, which corresponds to the minimum value required for performing joining.

The heating temperature at diffusion bonding is set to 1000° C. or more for a two-phase stainless steel, and 1100° C. or more for single-phase ferritic, austenitic or martensitic stainless steel sheets. Diffusion bonding can not sufficiently be achieved when these temperatures are not reached.

Solid phase diffusion at the surface of a stainless steel usually takes place staring at around 900° C. In particular, heating to 1100° C. or more can facilitate diffusion bonding in a short time because atomic diffusion is activated. However, heating to 1200° C. or more may decrease high-temperature strength and also tend to result in coarsened crystal grains. A decreased high-temperature strength may result in significant thermal deformation of articles to be joined during heating. Further, coarsened crystal grains may decrease the strength of a base material, resulting in deteriorated pressure resistance. Therefore, the present inventors have conducted studies to find a heating temperature at which diffusion bonding can be performed at a temperature as low as possible. As a result, the present inventors find that heating temperatures in the following ranges can be used for joining under conditions of the aforementioned chemical compositions, surface roughness and applied pressures: 1100° C. to 1200° C. for single-phase ferritic or austenitic or martensitic stainless steel sheets, 1000° C. to 1200° C. for a two-phase stainless steel sheet and 1100° C. to 1200° C. for joining between different materials among them. Note that the proper temperature for brazing of 1100° C. or more is preferably used when a braze material is partly used.

Diffusion bonding between stainless steel sheets can be performed by maintaining heating of those members to be joined under an atmosphere where a pressure of 1×10-2 Pa or less is achieved by vacuum suction. Diffusion bonding cannot be sufficiently achieved under an atmosphere of more than 1×10-2 Pa.

In a case where the ambient pressure is higher than 1×10-2 Pa (>1×10-2 Pa), oxygen harbored in a gap between stainless steel sheets to be joined may remain, resulting in formation of an oxide film on a joining surface layer upon heating. This significantly deteriorates the quality of joining. In a case where the ambient pressure is lower than 1×10-2 Pa, i.e., the ambient pressure is set to 1×10-2 Pa or less, an oxide film on the surface will be ultra-thin. Therefore, it is the optimal condition for diffusion bonding. Note that as described above, an inert gas such as Ar, He and N2 may be included when performing joining after the ambient pressure reaches 1×10-2 Pa or less.

A heating method in which the entire material in a furnace is uniformly heated with a heater can be used. The heat holding time may be set within a range of 30 to 120 min.

A heat holding time as short as possible is preferred in view of mass-productivity. However, the heating time of 30 min. or more was required in order to uniformly heat the entire articles to be joined to sufficiently excite atomic diffusion. On the other hand, a holding time of 120 min. or more facilitates growth of crystal grains to the extent where the strength of a base material is affected. Therefore, the holding time of 30 to 120 min. was preferably used.

EXAMPLES

Example 1

First, only box-like components each having a plate thickness of 0.4 mm were formed using a steel sheet having an element composition shown in Table 1. Then three of them were layered as shown in FIG. 5A. These are used to evaluate the joining quality of the test pieces. Here, the standing-wall angle θ was 30°, and a braze material was not applied. Further, the surface roughness Ra at a forming portion is 0.3 μm≤.

Figure 6:
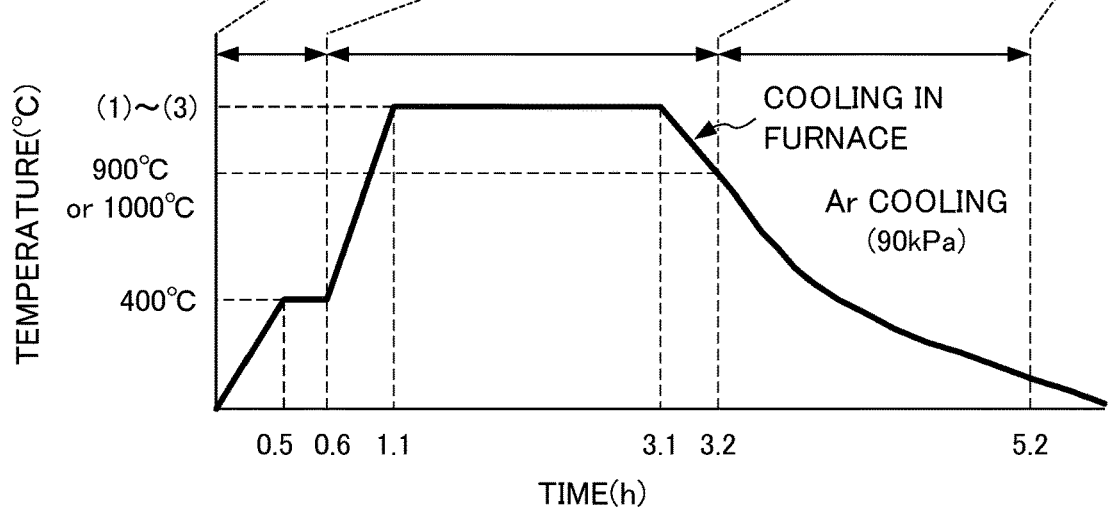
FIG. 6 illustrates a heating pattern when performing solid phase diffusion bonding according to Examples.

The above preliminary assembled article was subjected to diffusion bonding under conditions selected from those described in Table 2 and the heating patterns shown in FIG. 6. That is, it was placed in a horizontal vacuum furnace. Once the ambient pressure reached 1×10-2 Pa or less, heating was performed according to the heating pattern (3) shown in FIG. 6 with a heating temperature of 1200° C., a soaking time of 2.0 hours and a load surface pressure of 0.5 MPa. These conditions appear to be the upper limits of the temperature and surface pressure in view of mass-productivity.

A load was applied by placing a SUS 430 weight on a processed article which had been sandwiched with alumina ceramic plates from above and below. The applied pressure was simply adjusted to P sin θ/S=0.5 MPa wherein S (mm2) represents the total contact area at standing wall portions, and P (N) represents the weight of a weight.

TABLE 1

Component compositions of test pieces (mass) %

| Type of steel system | Sample No. | C | Si | Mn | Ni | Cr | Mo | Cu | Nb | Ti | Al | N | 0.1 Si + Ti + Al | Remarks |
|---|---|---|---|---|---|---|---|---|---|---|---|---|---|---|
| α-based stainless steel | 1 | 0.007 | 0.61 | 0.18 | 0.07 | 11.16 | 0.02 | 0.03 | — | 0.18 | 0.032 | 0.009 | 0.27 | Comparison material |
| | 2 | 0.008 | 0.38 | 0.28 | 0.25 | 17.22 | 0.04 | 0.05 | 0.15 | 0.18 | 0.022 | 0.012 | 0.24 | Comparison material |
| | 3 | 0.005 | 0.07 | 0.24 | 0.06 | 17.53 | 0.85 | 0.06 | — | 0.26 | 0.119 | 0.011 | 0.39 | Comparison material |
| | 4 | 0.010 | 0.18 | 0.20 | 0.22 | 17.10 | 0.13 | 0.05 | 0.12 | 0.24 | 0.021 | 0.012 | 0.28 | Comparison material |
| | 5 | 0.007 | 0.23 | 0.22 | 0.13 | 22.03 | 1.04 | 0.03 | 0.19 | 0.20 | 0.090 | 0.013 | 0.31 | Comparison material |
| | 6 | 0.006 | 0.11 | 0.20 | 0.16 | 29.50 | 1.90 | 0.05 | 0.19 | 0.17 | 0.082 | 0.014 | 0.26 | Comparison material |
| | 7 | 0.011 | 0.47 | 0.28 | 0.12 | 17.32 | 0.02 | 0.03 | 0.37 | 0 | 0.003 | 0.008 | 0.05 | Invented material |
| | 8 | 0.010 | 0.34 | 0.99 | 0.14 | 18.44 | 1.85 | 0.19 | 0.41 | 0 | 0.006 | 0.012 | 0.04 | Invented material |
| | 9 | 0.006 | 0.32 | 0.99 | 0.16 | 18.23 | 1.99 | 0.17 | 0.61 | 0 | 0.001 | 0.008 | 0.03 | Invented material |
| | 10 | 0.010 | 0.51 | 0.34 | 0.13 | 22.51 | 0.02 | 0.44 | 0.36 | 0 | 0.001 | 0.012 | 0.05 | Invented material |
| | 11 | 0.014 | 0.33 | 0.32 | 0.13 | 16.84 | 0.05 | 1.50 | 0.40 | 0 | 0.008 | 0.009 | 0.04 | Invented material |
| γ-based stainless steel | 12 | 0.017 | 1.44 | 2.03 | 7.10 | 16.58 | 0.24 | 1.91 | — | 0 | 0.005 | 0.013 | 0.15 | Comparison material |
| | 13 | 0.040 | 2.80 | 0.67 | 11.9 | 18.39 | 0.75 | 2.00 | — | 0 | 0.001 | 0.008 | 0.28 | Comparison material |
| | 14 | 0.042 | 3.28 | 0.75 | 13.2 | 19.07 | 0.10 | 0.10 | 0.09 | 0 | 0.02 | 0.022 | 0.35 | Comparison material |
| | 15 | 0.053 | 0.50 | 0.77 | 8.55 | 18.10 | 0.19 | 0.25 | — | 0 | 0.005 | 0.028 | 0.06 | Invented material |
| | 16 | 0.022 | 0.25 | 1.72 | 8.06 | 17.07 | 0.07 | 3.25 | — | 0 | 0.001 | 0.013 | 0.03 | Invented material |
| | 17 | 0.022 | 0.59 | 1.72 | 9.06 | 18.21 | 0.06 | 3.22 | — | 0 | 0 | 0.023 | 0.06 | Invented material |
| | 18 | 0.017 | 0.51 | 1.71 | 12.10 | 17.31 | 2.04 | 0.35 | — | 0 | 0.002 | 0.007 | 0.05 | Invented material |
| | 19 | 0.050 | 0.50 | 1.50 | 20.20 | 25.30 | 0.20 | — | — | 0 | 0 | 0.030 | 0.05 | Invented material |
| M-based stainless steel | 20 | 0.036 | 1.48 | 0.36 | 6.82 | 14.46 | 0.12 | 0.60 | — | 0.31 | 0.028 | 0.009 | 0.49 | Comparison material |
| | 21 | 0.340 | 0.56 | 0.55 | 0.13 | 13.40 | 0.03 | 0.04 | — | 0 | 0 | 0.015 | 0.06 | Invented material |
| | 22 | 0.980 | 0.28 | 0.43 | 0.12 | 16.25 | 0.21 | 0.03 | — | 0 | 0 | 0.007 | 0.03 | Invented material |
| Two-phase stainless steel | 23 | 0.064 | 0.51 | 0.28 | 0.21 | 16.35 | 0.02 | 0.03 | — | 0.01 | 0.001 | 0.015 | 0.06 | Invented material |
| | 24 | 0.078 | 0.57 | 0.32 | 0.27 | 16.22 | 0.08 | 0.03 | — | 0.01 | 0 | 0.022 | 0.07 | Invented material |
| | 25 | 0.024 | 0.51 | 0.53 | 0.08 | 11.78 | 0.09 | 0.03 | 0.01 | 0 | 0.002 | 0.017 | 0.05 | Invented material |
| | 26 | 0.065 | 0.28 | 0.76 | 0.14 | 12.48 | 0.04 | 0.10 | 0.03 | 0 | 0 | 0.011 | 0.03 | Invented material |
| | 27 | 0.083 | 0.27 | 0.85 | 0.09 | 12.19 | 0.03 | 0.04 | 0.02 | 0 | 0.002 | 0.013 | 0.03 | Invented material |
| | 28 | 0.230 | 0.53 | 0.32 | 2.04 | 16.55 | 0.03 | 0.04 | — | 0.01 | 0.009 | 0.142 | 0.01 | Invented material |

—: indicates additive-free

TABLE 2

Conditions of joining

| Test equipment | horizontal vacuum furnace |
|---|---|
| Ambient pressure (Pa) | ≤1 × 10$^{-2}$ |

TABLE 2-continued

| Conditions of joining | |
|---|---|
| Joining temperature (° C.) | 950~1250 |
| Pressure at load surface (MPa) | 0, 0.1, 0.3, 0.5 |
| Thickness of test piece (mm) | 0.4 |
| Surface roughness (μm) | 0.1, 0.2, 0.3, 0.4, 1.0, 2.0, 3.0 |

The resulting three-layer processed article was evaluated for the oxidation state of the inside and the quality of jointing at standing wall portions. The oxidation state of the inside was evaluated by visually observing coloring conditions of a cross section obtained after cutting the sample. The quality of jointing at standing wall portions was considered as no good when 5 cross sections were observed under a microscope, and a location of no joining at all was observed at least one of the cross sections.

Results are shown in Table 3.

The articles of the samples Nos. 7 to 11, Nos. 15 to 19, and Nos. 21 to 28 according to the present invention showed no coloring due to oxidation under conditions of 1200° C., 2.0 hours and 0.5 MPa, and a good joining quality. On the other hand, the samples Nos. 1 to 6, Nos. 12 to 14 and No. 20 from comparative experiments showed coloring and an unsatisfactory joining quality. Therefore, in the following experiments, only the articles according to the present invention were used to identify suitable jointing conditions.

TABLE 3

Results from Example 1

| Sample No. | Remarks | Internal oxidation | Quality of Jointing |
|---|---|---|---|
| 1 | Comparison material | X | X |
| 2 | Comparison material | X | X |
| 3 | Comparison material | X | X |
| 4 | Comparison material | X | X |
| 5 | Comparison material | X | X |
| 6 | Comparison material | X | X |
| 7 | Invented material | ○ | ○ |
| 8 | Invented material | ○ | ○ |
| 9 | Invented material | ○ | ○ |
| 10 | Invented material | ○ | ○ |
| 11 | Invented material | ○ | ○ |
| 12 | Comparison material | X | X |
| 13 | Comparison material | X | X |
| 14 | Comparison material | X | X |
| 15 | Invented material | ○ | ○ |
| 16 | Invented material | ○ | ○ |
| 17 | Invented material | ○ | ○ |
| 18 | Invented material | ○ | ○ |
| 19 | Invented material | ○ | ○ |
| 20 | Comparison material | X | X |
| 21 | Invented material | ○ | ○ |
| 22 | Invented material | ○ | ○ |
| 23 | Invented material | ○ | ○ |
| 24 | Invented material | ○ | ○ |
| 25 | Invented material | ○ | ○ |
| 26 | Invented material | ○ | ○ |
| 27 | Invented material | ○ | ○ |
| 28 | Invented material | ○ | ○ |

Example 2

Two of fin-like components having cross sectional shapes of (1) triangle, (2) trapezoid, (3) rectangle which had been formed from 0.4 mm steel sheets were arranged between the three-layer box-like components produced in No. 10, No. 16, No. 24 from Example 1. Then, a top plate and a bottom plate each having a plate thickness of 1.0 mm as shown in FIG. 3A were incorporated into the above box-like and fin-like components to obtain a preliminary assembled heat exchanger. Note that the angles θ of standing walls were corrected and varied by pressing. Test pieces to be subjected to diffusion bonding treatment for each of the contact regions indicated as "a" (between the top plate and the box-like component), "b" (between the bottom plate and the box-like component), "c" (between the fin parts) and "d" (between the standing wall sections of the box-like components) in FIG. 3A and FIG. 3B. Further, test pieces each having a pure Cu braze material applied on a portion of the contact regions were also prepared for the contact regions indicated as "c" and "d". At this time, the Cu braze material was applied in an amount of 0.3 g/cm2.

The above preliminary assembled heat exchanger was subjected to joining treatment under conditions of 1100° C., 2.0 hours and 0.3 MPa. The joining strength was measured by pressure tests. The pressure tests were performed as follows: 3 out of 4 joints (openings) provided on the upper surface-flat portion of the box-like component as illustrated in FIG. 4 were closed, and the hydraulic pressure was applied to the inside of the heat exchanger through the remaining one joint, and the occurrence of leakage was observed at a predetermined pressure of 3 MPa.

Results are shown together in Table 4. Nos. 1 to 9 from the examples of the present invention all showed no leakage at 3 MPa in the pressure tests, showing s good joining quality. On the other hand, in the case of No. 10 and No. 11 from comparative examples which had large standing-wall angles, and No. 12 which had no fins in the inside, the box-like components were crushed during the tests, indicating that they did not have sufficient pressure resistance.

TABLE 4

Results from pressure tests where the standing wall-angle in Example 2 were changed.

| Example No. | Sample No. | Standing wall-angle θ | Fin shape *1 | Joining method *2, 3 | | | | 3 MPa Pressure test *4 | Remarks |
|---|---|---|---|---|---|---|---|---|---|
| | | | | a | b | c | d | | |
| 1 | 10 | 15 | ① | D | D | B | D + B | ○ | Present invention |
| 2 | | 15 | ② | D | D | D | D + B | ○ | |
| 3 | | 15 | ③ | D | D | D | D + B | ○ | |
| 4 | 16 | 0 | ① | D | D | B | D + B | ○ | |
| 5 | | 15 | ① | D | D | B | D + B | ○ | |
| 6 | | 30 | ③ | D | D | D | D | ○ | |
| 7 | 24 | 15 | ② | D | D | D | D + B | ○ | |

TABLE 4-continued

Results from pressure tests where the standing wall-angle in Example 2 were changed.

| Example No. | Sample No. | Standing wall-angle θ | Fin shape *1 | Joining method *2, 3 a | b | c | d | 3 MPa Pressure test *4 | Remarks |
|---|---|---|---|---|---|---|---|---|---|
| 8 | | 15 | ② | D | D | D | D | ○ | |
| 9 | | 30 | ② | D | D | D | D | ○ | |
| 10 | | 45 | ② | D | D | D | D | X | Comparative |
| 11 | | 60 | ② | D | D | D | D | X | examples |
| 12 | | 30 | None | D | D | D | D | X | |

*1: ① Triangle, ② Trapezoid, ③ Rectangle
*2: a (Between top plate and box-like component), b (Between Bottom plate and box-like component), c (Fin parts), d (Standing walls of box-like components)
*3: D (Diffusion bonding), B (Brazing)
*4: ○ (No leakage), X (Leaked)

Among the examples of the present invention shown in Table 4, No. 7 represents an example where diffusion bonding was performed at "a" to "c", and brazing was performed at a portion of "d", and No. 8 represents an example where diffusion bonding was performed at "a" to "d". Using these representative test examples, joining conditions of a temperature, time, applied pressure and ambient pressure were varied to identify suitable joining conditions.

Results are shown in Table 5. No. 13 and No. 15 showed imperfect joining due to insufficient melting of a braze material. Further, in the case of No. 14 and No. 16, the temperature and time fell outside the ranges to the side of a higher temperature and longer time. In the case of No. 18, significant deformation occurred during heating due to an excessive applied pressure, showing deteriorated pressure resistance. The applied pressure was too low for No. 17, and the ambient pressure in the atmosphere was too low for No. 19. In either of the cases, joining was insufficient, and the pressure resistance was poor.

These results demonstrate that joining conditions outside of the ranges defined herein cannot provide sufficient pressure resistance. It should be noted that joining under conditions within the ranges defined herein can provide sufficient pressure resistance as shown in Table 3 and No. 20.

TABLE 5

Results from pressure tests where the conditions of joining in Example 2 were changed.

| Example No. | Example Numbers in Table 4 | Heating temperature (° C.) | Soak time (h) | Applied pressure (MPa) | Degree of vaccum (Pa) | 3 MPa Pressure test *5 |
|---|---|---|---|---|---|---|
| 13 | 7 | 950 | 2.0 | 0.3 | $1 \times 10^{-3}$ | X |
| 14 | | 1250 | 2.0 | 0.3 | $1 \times 10^{-3}$ | X |
| 15 | | 1000 | 0.15 | 0.3 | $1 \times 10^{-3}$ | X |
| 16 | | 1200 | 4.0 | 0.3 | $1 \times 10^{-3}$ | X |
| 17 | 8 | 1100 | 2.0 | 0 | $1 \times 10^{-3}$ | X |
| 18 | | 1100 | 2.0 | 1.5 | $1 \times 10^{-3}$ | X |
| 19 | | 1100 | 2.0 | 0.3 | $1 \times 10^{-0}$ | X |
| 20 | | 1100 | 2.0 | 0.3 | $1 \times 10^{-2}$ | ○ |

*5: ○ (No leakage), X (Leaked)

The invention claimed is:

1. A plate-type heat exchanger comprising:
   a housing; the housing comprising:
   a plurality of rectangular box components each having the same shape and having a standing wall section along a peripheral edge, and one of the rectangular box components is layered on another of the rectangular box components reversed in the horizontal direction to form a layered structure having an upper layer component and a lower layer component such that an upper portion of a standing wall section of the lower layer component of the layered structure is fit into a lower portion of a standing wall section of the upper layer component of the layered structure, and the angle (θ) of the standing wall sections with respect to a vertical direction of an upper side-flat portion is 15°≤θ≤30°, and a contact region between the upper portion of the standing wall section and the lower portion of the standing wall section is joined by solid phase diffusion bonding;
   wherein a fin having a cross-sectional shape of a triangle or trapezoid or rectangle and having its tip located at the same position as an upper side-flat portion of the rectangular box components with respect to a height direction is formed at the upper side-flat portion of the rectangular box components, and
   a tip of the fin of the lower layer component makes contact with the tip of the fin of the upper layer component.

2. The plate-type heat exchanger according to claim 1, wherein the rectangular box components are press-formed articles each having two types of opening sections at symmetrical positions on an upper side thereof, one being an upwardly protruded opening section which is opened and protruded upwardly from each of the box-like components and the other being a downwardly protruded opening section which is opened and protruded at the same height downwardly from each of the box-like components, and an upper side of the upwardly protruded opening section of the lower layer component is joined with a lower side on the downwardly protruded opening section of the upper layer component at a contact region therebetween by solid phase diffusion bonding or braze bonding.

3. The method of manufacturing the plate-type heat exchanger according to claim 1, the method comprising heating a layered assembly of the box-like components prepared with a single-phase ferritic stainless steel sheet or an austenitic stainless steel sheet or a martensitic stainless steel sheet having a chemical composition of 0.1 Si+Ti+Al<0.15 mass % and a surface roughness of Ra≤0.3 μm under an atmosphere of a heating temperature of 1100° C. or more, an applied pressure of 0.3 MPa or more and an ambient pressure of $1\times10^{-2}$ Pa or less to perform solid phase diffusion bonding.

4. The method of manufacturing the plate-type heat exchanger according to claim 1, the method comprising heating a layered assembly of the box-like components prepared with a two-phase stainless steel sheet having a chemical composition of 0.1 Si+Ti+Al<0.15 mass % and a surface roughness of Ra≤2.0 μm under an atmosphere of a heating temperature of 1000° C. or more, an applied pressure of 0.1 MPa or more and an ambient pressure of $10^{-2}$ Pa or less to perform solid phase diffusion bonding.

* * * * *